United States Patent [19]

Mayer

[11] Patent Number: 4,648,245
[45] Date of Patent: Mar. 10, 1987

[54] ELECTRO-HYDRAULIC ACTUATOR OR POSITIONING DRIVE FOR CONTINUOUS CONTROL OR REGULATION OPERATIONS

[75] Inventor: Hans-Michael Mayer, Jona, Switzerland

[73] Assignee: Elektrowatt AG, Zurich, Switzerland

[21] Appl. No.: 729,061

[22] Filed: Apr. 30, 1985

[51] Int. Cl.$^4$ .............................................. F16D 31/02
[52] U.S. Cl. ...................................... 60/477; 60/387
[58] Field of Search ...................... 60/387, 437, 477

[56] References Cited

U.S. PATENT DOCUMENTS

| 2,040,403 | 5/1936 | Persons | 60/477 X |
|---|---|---|---|
| 2,669,095 | 2/1954 | Bishofberger | 60/477 X |
| 3,285,267 | 11/1966 | Groth | 137/102 |
| 4,355,653 | 10/1982 | Credle, Jr. | 137/102 |
| 4,458,487 | 7/1984 | Kojima et al. | 60/477 |

FOREIGN PATENT DOCUMENTS

| 0154854 | 9/1985 | European Pat. Off. |
| 3028532 | 4/1981 | Fed. Rep. of Germany |
| 3122120 | 1/1983 | Fed. Rep. of Germany |
| 1311466 | 10/1962 | France |
| 2302431 | 9/1976 | France |
| 2324914 | 4/1977 | France |
| 310959 | 5/1969 | Sweden |
| 1115200 | 5/1968 | United Kingdom |
| 1281133 | 7/1972 | United Kingdom |
| 1336676 | 11/1973 | United Kingdom |
| 1414717 | 11/1975 | United Kingdom |
| 1454140 | 10/1976 | United Kingdom |
| 2034933 | 6/1980 | United Kingdom |
| 2084252 | 4/1982 | United Kingdom |
| 2100392 | 12/1982 | United Kingdom |

Primary Examiner—Stephen F. Husar
Attorney, Agent, or Firm—Werner W. Kleeman

[57] ABSTRACT

A piston sealed by a rolling membrane is arranged in a cylindrical housing comprising two components and this piston translates against the force of a return spring. A vibrating armature pump driven via two wires by a variable alternating voltage serves for operating the positioning drive. The vibrating armature pump draws hydraulic fluid from a reservoir chamber through an inlet opening and transports the hydraulic fluid through a return valve and through a first orifice into a pressure chamber. The piston is displaced downwardly conjointly with a piston rod. The pressure generated by the vibrating armature pump is dependent upon the applied voltage. A state of equilibrium between this pressure and the counterpressure of the spring arises such that the positioning drive is suitable for continuous control or regulation operations. The return valve comprises a membrane valve which decisively influences the intended working characteristics of the positioning drive, since it responds to small differences in pressure.

10 Claims, 6 Drawing Figures 4,648,245

ELECTRO-HYDRAULIC ACTUATOR OR POSITIONING DRIVE FOR CONTINUOUS CONTROL OR REGULATION OPERATIONS

BACKGROUND OF THE INVENTION

The present invention broadly relates to continuous control or regulation devices and, more specifically, pertains to a new and improved construction of an electro-hydraulic actuator or positioning drive for performing continuous control or regulation operations.

Generally speaking, the positioning drive or actuator of the present invention comprises a vibrating armature pump for delivering a hydraulic fluid, a pressure-operated return valve, an actuation member and a return spring acting upon the actuation member. The actuation member is displaceable by the hydraulic fluid against the force of the return spring in dependence of an externally supplied positioning or adjustment signal.

A considerable disadvantage of known actuators or positioning drives of this type is the requisite supply of an operating voltage for the vibrating armature pump and of an adjustment or positioning signal for controlling the actuation member which are mutually independent of one another. The actuation member may be a piston or a membrane. The actuation member is controlled either by on-off control of the pump or by influencing the pressure generated by the pump. In either case, two non-interchangeable pairs of electrical conductors are required for operating the actuator or positioning drive.

Since the actuation member operates against the force of a return spring, a pressure-dependent return valve having a throttling function is required in order to permit return flow of the hydraulic fluid delivered by the pump.

An actuator or positioning device known from the French Patent Publication No. 2,324,914, published Apr. 15, 1977, comprises an electrically controlled solenoid valve as the return valve which requires yet a further conductor.

On the other hand, the French Pat. No. 1,311,466, granted Oct. 29, 1962, discloses an actuator or positioning drive having a self-operating return valve in the form of a valve combination. This valve combination comprises a small piston-operated valve which closes against the force of a return spring under a pressure increase of the pressure medium delivered by the pump and a spring-loaded pressure retention valve which permits access to the actuation member under an increase in pressure. This known actuator or positioning drive is therefore not only complicated in construction but also displays appreciable leakage and pressure losses.

A piston serving as an actuation member is generally sealed against the cylinder by means of O-ring or stuffing box seals. The friction forces arising in this type of seal produce a hysteresis effect in actuators or positioning drives operating against the force of a spring and which hysteresis effect is so great that it is hardly possible to employ such actuators or positioning drives for continuous control or regulation operations.

SUMMARY OF THE INVENTION

Therefore, with the foregoing in mind, it is a primary object of the present invention to provide a new and improved construction of an electro-hydraulic actuator or positioning drive for continuous control or regulation operations which does not exhibit the aforementioned drawbacks and shortcomings of the prior art constructions.

Another and more specific object of the present invention aims at providing a new and improved construction of an actuator or positioning drive of the previously mentioned type which requires only a single pair of electrical conductors for control and operation.

Yet a further significant object of the present invention aims at providing a new and improved construction of an actuator or positioning drive of the character described which is relatively simple in construction and design, extremely economical to manufacture, highly reliable in operation, not readily subject to breakdown or malfunction and requires a minimum of maintenance and servicing.

Now in order to implement these and still further objects of the invention, which will become more readily apparent as the description proceeds, the electro-hydraulic actuator or positioning drive for continuous control or regulation and constructed according to the present invention is manifested by the features that the vibrating armature pump is powered directly by the externally supplied adjustment or positioning signal, the externally supplied adjustment or positioning signal comprises a variable current signal, such as a variable voltage alternating-current signal, the vibrating armature pump is capable of generating a variable pressure in the hydraulic fluid in direct dependence of the variable voltage or potential of the externally supplied adjustment or positioning signal and the pressure-operated return valve comprises a membrane valve.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings there have been generally used the same reference characters to denote the same or analogous components and wherein.

DETAILED DESCRIPTION OF THE PREFERRED EMBODIMENTS

Figure 1:
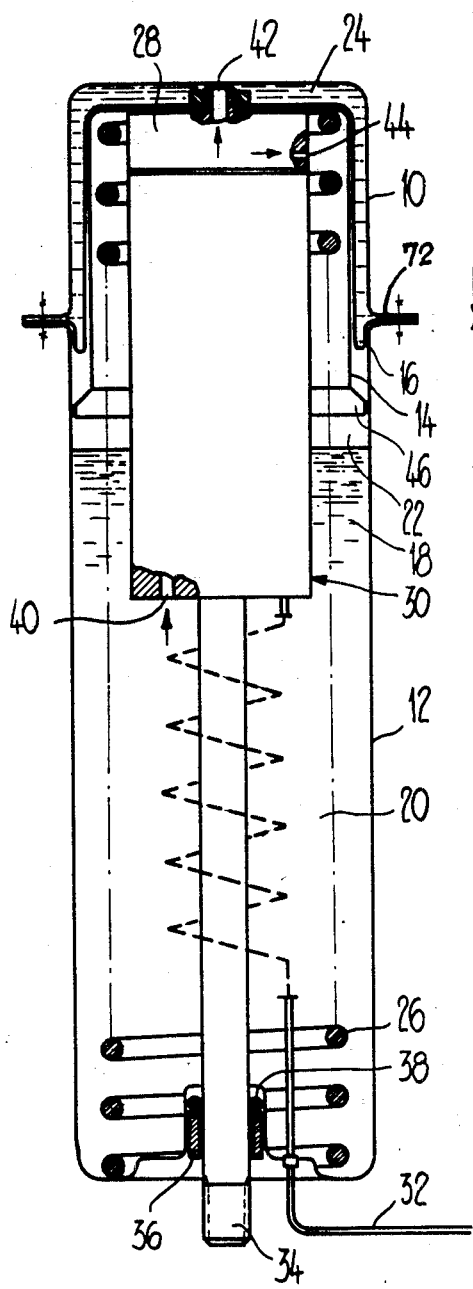
FIG. 1 schematically shows an electro-hydraulic actuator or positioning drive according to the invention in partial longitudinal section.

Describing now the drawings, it is to be understood that to simplify the showing thereof only enough of the structure of the electro-hydraulic actuator or positioning drive for performing continuous control or regulation operations has been illustrated therein as is needed to enable one skilled in the art to readily understand the underlying principles and concepts of this invention. Turning specifically to FIG. 1 of the drawings, the apparatus illustrated therein by way of example and not limitation will be seen to comprise a housing 10, 12 in which the electro-hydraulic actuator or positioning drive is accommodated. This housing 10, 12 comprises an upper cylinder portion or component 10 and a lower cylinder portion or component 12. A hollow cup-shaped or bell-shaped piston 14, defining an actuating member, is guided within the cylindrical housing 10, 12 and is sealed against the wall of the cylinder portion or component 12 by a rolling membrane 16 or the like. The space beneath the rolling membrane 16 constitutes a reservoir or supply chamber 20 partially filled with a suitable hydraulic fluid 18. A gas cushion 22 is situated above the surface of the hydraulic fluid 18. The space above the rolling membrane 16 constitutes a pressure chamber 24. The rolling membrane 16 is clamped between flanges 72 of the two cylinder portions or components 10 and 12.

The piston 14 is biased or pre-loaded toward the pressure chamber 24 by the force of a return spring 26 arranged within the housing 10, 12. A vibrating or oscillating armature pump 30 is arranged within the piston 14. The vibrating armature pump 30 is electrically operable and communicates with a return valve or return flow valve 28. A twin lead supply conductor 32 of the vibrating armature pump 30 is conducted out of the lower housing or cylinder portion or component 12. The piston 14 is connected through the return valve 28 and the vibrating armature pump 30 with a plunger or piston rod 34. The piston rod 34 is guided in a guide bushing 36 connected with the lower housing or cylinder portion or component 12 and is sealed by means of an O-ring seal 38.

The vibrating armature pump 30 comprises an inlet or suction opening 40 which is always situated beneath the surface of the hydraulic fluid 18 independently of the position of the actuator or positioning drive. The return valve 28 communicating with the vibrating armature pump 30 also communicates with the pressure chamber 24 through a first orifice or port 42. The return valve 28 further communicates with the reservoir or supply chamber 20 through a second orifice or port 44, since the lower end 46 of the bell-shaped or cup-shaped piston 14 is open. It will also be seen in FIG. 1 that the edge of the piston 14 has a greater diameter at the lower end 46 than does the piston 14 in its remaining region. The larger diameter at the lower end 46 serves as a guide means within the lower cylindrical housing portion or component 12.

Figure 2:
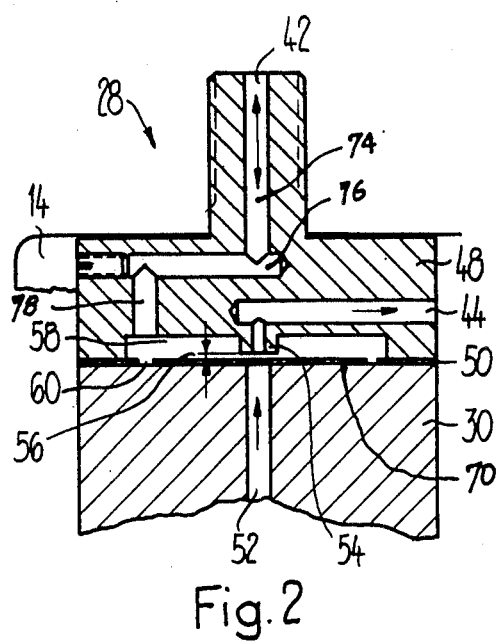
FIG. 2 schematically shows a longitudinal section through the return valve of the actuator or positioning drive of FIG. 1.

The return valve 28 is shown in detail in FIG. 2. This return valve 28 comprises a valve housing 48 which communicates with the vibrating armature pump 30 through an interposed valve membrane 50. This valve membrane 50 comprises a circular metal disk of small thickness. The pressure side or delivery side of the vibrating armature pump 30 is formed by a conduit 52 which opens axially toward the underside of the valve membrane 50. This delivery side conduit 52 is closed or obturated by the valve membrane 50 when such valve membrane 50 is in its idle position illustrated in FIG. 2.

A valve seat 54 is situated opposite the conduit 52 on the upper side of the valve membrane 50. This valve seat 54 communicates with the second orifice or port 44 opening into the reservoir chamber 20. The valve membrane 50 is situated at a distance 56 from the valve seat 54 in its idle position, so that the second orifice 44 communicates with an annular space or chamber 58 arranged above the valve membrane 50. The annular space or chamber 58 is in constant communication with the first orifice or port 42 opening into the pressure chamber 24 through the interconnecting bores 74, 76 and 78 shown in FIG. 2. The valve membrane 50 comprises at least one through opening or aperture 60 outside of its central region and which is closed against or obturated by the substantially flat upper surface 70 of the vibrating armature pump 30 in the idle position of the valve membrane 50.

Figure 3:
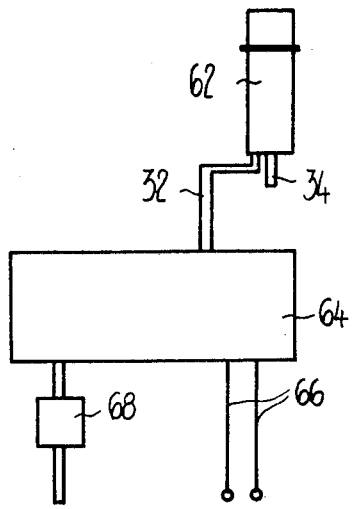
FIG. 3 schematically shows a circuit diagram for connecting the actuator or positioning drive.

FIG. 3 shows a circuit diagram in which the actuator or positioning drive illustrated in FIG. 1 is designated with the reference numeral 62. This actuator or positioning drive 62 is connected with a regulator or control device 64 by the twin lead connecting or supply conductor 32 which, in turn, has a mains connection or electrical supply connection 66 and is connected to a sensor 68. This sensor 68 can, for instance, be a temperature sensor.

The regulator or control device 64 is intended for continuous control or regulation and therefore delivers a continuously variable adjustment signal through the conductor 32 to the actuator or positioning drive 62 which is intended for adjusting or actuating an adjustable or actuatable member such as, for instance, a valve or an air damper. The adjustment signal may, for instance, be a variable voltage alternating current having sinusoidal, rectangular or saw tooth wave form. The two wires or leads of the twin lead connecting or supply conductor 32 between the regulator or control device 64 and the actuator or positioning drive 62 may be exchanged at will without detrimental effect. The adjustment signal is supplied to the vibrating armature pump 30 situated in the actuator or positioning drive 62. Vibrating armature pumps are well known and need therefore not be described in more detail here.

Figure 4:
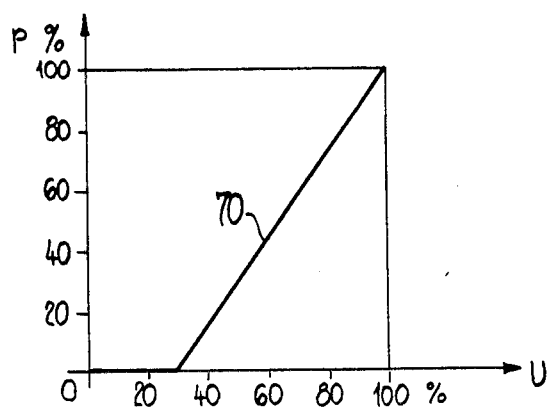
FIG. 4 schematically shows a diagram of the operating characteristic of a vibrating armature pump.

FIG. 4 illustrates the working or operating characteristics of the vibrating armature pump 30 in a diagram in the form of a characteristic curve 70. The supply voltage is indicated in percent (%) along the abscissa and the static pressure is indicated in percent (%) along the ordinate.

Figure 5:
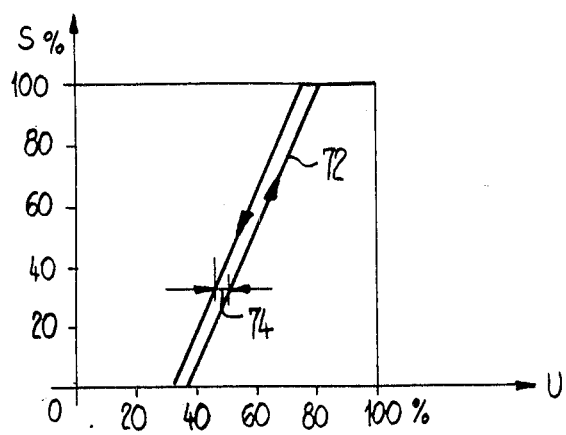
FIG. 5 schematically shows a diagram of the operating characteristic of the actuator or positioning drive of the invention.

FIG. 5 shows the working or operating characteristics of the actuator or positioning drive 62. The corresponding characteristic curve 72 is drawn in double lines in order to indicate that a hysteresis effect is present which has the interval 74. Once again, the supply voltage is indicated in percent (%) along the abscissa, while the actuation or positioning stroke of the plunger or piston rod 34 is indicated in percent (%) of travel along the ordinate.

Figure 6:
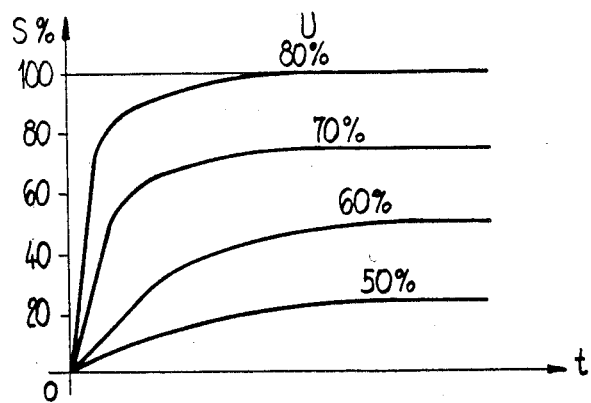
FIG. 6 schematically shows a diagram of the temporal operating characteristic of the actuator or positioning drive of the invention.

FIG. 6 shows the temporal working or operating characteristics of the actuator or positioning drive 62 in the form of characteristic curves corresponding to 50%, 60%, 70% and 80% of the supply voltage. In this figure, time is indicated along the abscissa and the actuation or positioning stroke is indicated in percent (%) of travel along the ordinate.

In the following, the manner of operation of the actuator or positioning drive 62 will be explained in relation to FIGS. 1 and 2. If an electrical alternating-voltage signal of suitable frequency and sufficient strength is applied to the electrical supply conductor 32, then the vibrating armature pump 30 begins to operate. This vibrating armature pump 30 inducts or draws in hydraulic fluid 18 from the reservoir or supply chamber 20 through the inlet or suction opening 40 and delivers such hydraulic fluid 18 through the return valve 28 and the first orifice or port 42 into the pressure chamber 24. In order that the delivered hydraulic fluid 18 may be accommodated in the pressure chamber 24, the piston 14 must move correspondingly downward in the direction of the guide bushing 36 conjointly with the rolling membrane 16, the return valve 28, the vibrating armature pump 30 and the plunger or piston rod 34. This motion continues until equilibrium is attained between the delivery pressure of the vibrating armature pump 30, i.e. the piston force corresponding to this pressure, and the counterforce of the return spring 26.

If the electrical alternating-voltage signal is reduced in strength, then the delivery pressure generated by the vibrating armature pump 30 will diminish in accordance with the operating characteristics illustrated in FIG. 4. The pressure in the pressure chamber 24 is then greater than the pump pressure due to the counterforce of the return spring 26. In this case, the return valve 28 allows hydraulic fluid 18 to flow back through the second orifice or port 44 into the reservoir or supply chamber 20. The piston 14 moves back or returns and the return spring 26 relaxes until equilibrium is reestablished.

The return valve 28 according to FIG. 2 operates in the following manner: if the vibrating armature pump 30 begins to deliver the hydraulic fluid 18 through the delivery side conduit 52, then the valve membrane 50 is initially bent or bowed up in its middle region until it bears upon the valve seat 54 and obturates the second orifice or port 44. Subsequently, the valve membrane 50 is bowed up into the annular space or chamber 58 so far that the apertures 60 lift off the end face or flat upper surface 70 of the vibrating armature pump 30 and hydraulic fluid 18 is delivered through the first orifice or port 42 into the pressure chamber 24 (cf. FIG. 1). In a state of equilibrium between piston force and the counterforce of the return spring 26, delivery of hydraulic fluid ceases. The pressure ahead of and behind the valve membrane 50 therefore nearly equalizes and this valve membrane 50 may lift slightly off the valve seat 54 and allow a very small leakage quantity of hydraulic fluid 18 to escape through the second orifice or port 44 into the reservoir or supply chamber 20.

If the delivery pressure of the vibrating armature pump 30 diminishes, then the pressure in the pressure chamber 24 is greater and causes the valve membrane 50 to return to its idle position. The valve membrane 50 therefore lifts off the valve seat 54 and exposes the return flow orifice or port 44 through which hydraulic fluid 18 now flows back into the reservoir or supply chamber 20 until a new state of equilibrium is attained.

The sensitivity and flow rate of the return valve 28 can be influenced in simple manner by proper choice of dimensions.

The vibrating armature pump 30 is preferably designed for a nominal or rated voltage or potential of, for example, 220 Volts or, for example, 24 Volts at a frequency of, for example, 50 Hz.

The adjustment or positioning signal to be delivered by the regulator or control device 64 should comprise a voltage lying between about 30% and 100% of the nominal voltage. This can be supplied in the form of alterations of, for instance, a sinusoidally varying voltage, for instance by a variable transformer or by pulse modulation control.

In the actuator or positioning drive according to the invention, the voltage-dependent continuous operating characteristics of the vibrating armature hydraulic pump 30 are exploited to achieve continuous adjustability of the actuator or positioning drive 62. The return valve 28 described in relation to FIG. 2 is capable of operating reliably at very small pressure differences since it comprises only a single moving part, namely the low-friction movable valve membrane 50 serving as a blocking member.

The employment of the rolling membrane 16 sealing the piston 14, which is preferably a thin-walled rolling membrane, presents hardly any resistance to the actuation of the piston 14, so that only slight advancing forces are required. For short actuating strokes, metal bellows can also rolling membrane or of a bellows, as well as the construction of the return valve as a membrane as the only movable component, constitute significant prerequisites for achieving continuous operating characteristics in an actuator or positioning drive operating against the force of a return spring and fed by only two wires.

The construction of the invention therefore simplifies not only the construction of actuators or positioning drives of the type described but also the electrical installations in the equipment to be regulated or controlled. Furthermore, the paucity of movable components ensures largely disturbance-free operation.

While there are shown and described present preferred embodiments of the invention, it is to be distinctly understood that the invention is not limited thereto, but may be otherwise variously embodied and practiced within the scope of the following claims. Accordingly,

What I claim is:

1. An electro-hydraulic actuator for performing continuous control or regulation operations, comprising:
   a vibrating armature pump for delivering a hydraulic fluid;
   a pressure-operated return valve cooperating with said vibrating armature pump;
   an actuation member cooperating with said vibrating armature pump;
   a return spring acting upon said actuation member;
   said actuation member being displaceable by the hydraulic fluid acting in a pressure chamber against the force of said return spring in dependence of an externally supplied adjustment signal;
   means for delivering said externally supplied adjustment signal;
   said externally supplied adjustment signal comprising an alternating-current signal of variable potential;
   said vibrating armature pump being powered directly by the externally supplied adjustment signal;
   said vibrating armature pump being capable of generating a variable pressure in the hydraulic fluid in direct dependence of said variable potential of the externally supplied adjustment signal;
   said vibrating armature pump being capable of generating a pressure differential between said vibrating armature pump and said pressure chamber of said actuation member; and
   said pressure-operated return valve comprising as a control element only a membrane valve for controlling a return flow of said hydraulic fluid in dependence of said pressure differential.

2. An electro-hydraulic actuator for performing continuous control or regulation operations, comprising:
   a vibrating armature pump for delivering a hydraulic fluid;

a pressure-operated return valve cooperating with said vibrating armature pump;

an actuation member cooperating with said vibrating armature pump;

a return spring acting upon said actuation member;

said actuation member being displaceable by the hydraulic fluid against the force of said return spring in dependence of an externally supplied adjustment signal;

means for delivering said externally supplied adjustment signal;

said externally supplied adjustment signal comprising an alternating-current signal of variable potential;

said vibrating armature pump being powered directly by the externally supplied adjustment signal;

said vibrating armature pump being capable of generating a variable pressure in the hydraulic fluid in direct dependence of said variable potential of the externally supplied adjustment signal;

said pressure-operated return valve comprising a membrane valve;

said actuation member at least partially defining a pressure chamber and a reservoir chamber for the hydraulic fluid of the electro-hydraulic actuator;

said pressure-operated return valve comprising an annular valve chamber;

said annular valve chamber communicating with said pressure chamber;

said vibrating armature pump defining a delivery side thereof;

said membrane valve comprising a valve membrane;

said valve membrane being arranged between said delivery side and one of said pressure chamber and said annular valve chamber;

a valve seat cooperating with said valve membrane and arranged on a side of said valve membrane confronting said pressure chamber;

said valve seat having an orifice obturatable by said valve membrane; and said orifice communicating with said reservoir chamber.

3. The electro-hydraulic actuator as defined in claim 2, wherein:

said vibrating armature pump comprises a substantially flat surface;

said valve membrane comprising an effective region thereof cooperating with said valve seat and at least one aperture arranged outside of said effective region;

said membrane valve having an idle position;

said valve membrane seating on said substantially flat surface when said membrane valve is in said idle position; and said substantially flat surface obturating said at least one aperture when said valve membrane is seated thereupon.

4. The electro-hydraulic actuator as defined in claim 2, wherein:

said valve membrane comprises a thin circular metal disk.

5. The electro-hydraulic actuator as defined in claim 2, wherein:

said delivery side of the vibrating armature pump comprises a conduit; and said conduit being situated axially opposite said valve seat.

6. The electro-hydraulic actuator as defined in claim 4, wherein:

said valve membrane has a central region; and said valve seat cooperating with said valve membrane at said central region.

7. An electro-hydraulic actuator for performing continuous control or regulation operations, comprising:

a vibrating armature pump for delivering a hydraulic fluid;

a pressure-operated return valve cooperating with said vibrating armature pump;

an actuation member cooperating with said vibrating armature pump;

a return spring acting upon said actuation member;

said actuation member being displaceable by the hydraulic fluid against the force of said return spring in dependence of an externally supplied adjustment signal;

means for delivering said externally supplied adjustment signal;

said externally supplied adjustment signal comprising an alternating-current signal of variable potential;

said vibrating armature pump being powered directly by the externally supplied adjustment signal;

said vibrating armature pump being capable of generating a variable pressure in the hydraulic fluid in direct dependence of said variable potential of the externally supplied adjustment signal;

said pressure-operated return valve comprising a membrane valve;

said actuation member comprises a substantially cup-shaped piston;

said return valve and said vibrating armature pump being conjointly mounted at least partially within said substantially cup-shaped piston;

said substantially cup-shaped piston having a piston rod; and said piston rod being fastened to said vibrating armature pump.

8. The electro-hydraulic actuator as defined in claim 7, further including:

a substantially cylindrical housing defining a cylinder wall of the electro-hydraulic actuator;

said substantially cup-shaped piston being guided in said substantially cylindrical housing;

a rolling membrane for sealing said substantially cup-shaped piston against said cylinder wall; and an O-ring seal through which there is conducted said piston rod out of said substantially cylindrical housing.

9. The electro-hydraulic actuator as defined in claim 7, further including:

a substantially cylindrical housing defining a cylinder wall of the electro-hydraulic actuator;

said substantially cup-shaped piston being guided in said substantially cylindrical housing;

a metal bellows for sealing said substantially cup-shaped piston against said cylinder wall; and an O-ring seal through which there is conducted said piston rod out of said substantially cylindrical housing.

10. The electro-hydraulic actuator as defined in claim 7, wherein:

said substantially cup-shaped piston has a side remote from said pressure chamber; and said reservoir chamber being situated on said remote side.

* * * * *